United States Patent Office 3,219,669
Patented Nov. 23, 1965

3,219,669
RECOVERY OF 6-AMINO-PENICILLANIC ACID
Jean Preud'homme, Paris, Bernard Vuillemin, Yerres, Seine-et-Oise, and Yvan Charpentie, Paris, France, assignors to Rhone Poulenc S.A., a corporation of France
No Drawing. Filed Jan. 8, 1962, Ser. No. 164,982
Claims priority, application France, Jan. 18, 1961, 850,033
3 Claims. (Cl. 260—306.7)

The present invention relates to new derivatives of 6-amino-penicillanic acid, their preparation and their use in the industrial extraction of 6-amino-penicillanic acid from impure aqueous solutions, such as fermentation broths, which generally contain it in concentrations of 100 to 1000 mg. per litre.

In an attempt to discover a derivative of 6-amino-penicillanic acid which can be produced by treating the said acid in aqueous solution and which can be extracted from aqueous solution by an organic solvent which is itself immiscible with water and is sufficiently labile to enable free 6-amino-penicillanic acid to be recovered at a later stage from a solution of the said acid in the said solvent, it has been found that the imines formed by the condensation of 6-amino-pencillanic acid with aldehydes are particularly suitable such derivatives.

According to a feature of the invention therefore there are provided the imines which are the condensation products of 6-amino-penicillanic acid with aliphatic or aromatic aldehydes and the salts of these imines.

The imines of the invention may be formed with aldehydes such as formaldehyde, acetaldehyde, butyraldehyde, 2-ethyl-butyraldehyde, anisaldehyde, benzaldehyde or salicylaldehyde. The imines formed with the aromatic aldehydes are particularly valuable.

According to a further feature of the invention there is provided a process for the preparation of an aforesaid imine which comprises mixing with agitation and at a temperature from 0° to 30° C. an aqueous solution of 6-amino-penicillanic acid and from 1 to 30 moles per mole of the acid of an aliphatic or aromatic aldehyde, the pH of the said solution being adjusted to from 6 to 9. The agitation of the reaction mixture may be effected for a period varying from a few minutes to several hours. The preferred proportions of the reactants are 10 to 20 moles of aldehyde per mole of 6-amino-pencillanic acid and the preferred conditions are a reaction time of 30 minutes to one hour, a pH from 7 to 8 and a temperature from 20° to 30° C.

The imine obtained by the above process may be extracted from its aqueous solution by a technique analogous to that which is used for penicillin, i.e., extraction, after acidification to a pH from 1 to 4, with a water-immiscible solvent, for example an alcohol such as butyl or amyl alcohol, an ester such as ethyl, butyl or amyl acetate, a ketone such as methyl isobutyl ketone, or a chlorinated solvent such as methylene chloride. Because of the low stability of the imine, it is preferable to cool the solution to from 0° to +5° C. before acidification and subsequent extraction. The highest yield is obtained when the extraction is carried out rapidly after acidification to a pH from 2.3 to 2.7, for example, by continuously running the cooled aqueous solution of the imine, the organic solvent and the quantity of acid necessary to adjust the pH to the desired value into a vessel provided with an agitator and then immediately centrifuging the mixture to separate the phases. The use of a multi-stage extraction centrifuge gives particularly good results.

The crude imine may be isolated from solution in the solvent by one of several methods; for example, by evaporation of the solution to dryness under reduced pressure at about 0° C.; by precipitation of the imine in the form of one of its insoluble salts, such as the sodium or potassium salt, after concentration of the solution at low temperature under reduced pressure, by neutralization with the corresponding base or by the addition of a sodium or potassium salt soluble in the solvent; it is also possible to extract the imine from solution in the solvent with water by adjusting the pH to from 6 to 9 with an alkali and then precipitating a water-insoluble salt of the imine, such as its salt with dibenzylethylenediamine, from the aqueous solution. In this last case, it is preferable to carry out the precipitation from a fairly concentrated aqueous solution, which is obtained by concentrating under reduced pressure either the solution in the solvent before extraction with water or the aqueous solution itself; it is also possible to carry out several successive extractions, first from the solvent with water at a pH from 6 to 9, then from the aqueous solution with a solvent in acid medium, and again with water at a pH from 6 to 9, with reduction of volume at each stage. It may be advantageous to use a combination of two or more of the above described extraction methods.

The liberation of 6-amino-penicillanic acid from the salt of the imine is effected by hydrolysis with a dilute acid solution. The hydrolysis can be carried out from 0° to 30° C. but, because of the poor stability of the imine, it is preferable to cool the reaction medium to from 0° to +5° C. The crude imine salt is suspended with stirring in water to produce a concentration of 4 to 20% and then acidified with a strong acid, such as hydrochloric, sulphuric or phosphoric acid, to a pH from 1 to 2. A water-immiscible solvent capable of extracting the freed aldehyde is then added while stirring is continued. This solvent may be an alcohol such as butanol, a pentanol or methylisobutylcarbinol, as ester such as ethyl or amyl acetate, a chlorinated solvent such as chloroform or methylene chloride or a hydrocarbon such as benzene or hexane. In the case of an impure imine, the use of good solvents such as butanol or methylisobutylcarbinol, which can in addition extract certain impurities, lead to the production of purer 6-amino-penicillanic acid. After a period of stirring of from 15 to 60 minutes, any insoluble material is removed by filtration and the aqueous phase separated. The 6-amino-penicillanic acid crystallises from the solution on adjustment of the pH to from 3 to 5, preferably from 3.3 to 3.6, by means of an alkali, such as sodium, potassium or ammonium hydroxide, and is isolated by separation and drying. A second fraction may be isolated by concentration of the mother liquors under reduced pressure at low temperature and readjustment of the pH to the value indicated above.

According to a further feature of the invention therefore there is provided a process for the preparation of substantially pure 6-amino-penicillanic acid from a dilute aqueous solution thereof which comprises mixing with agitation and at a temperature from 0° to 30° C. the said aqueous solution and from one to 30 moles per mole of the acid of an aliphatic or aromatic aldehyde, the said solution being adjusted to a pH from 6 to 9, extracting the imine thus formed from the resultant reaction mixture with a water-immiscible organic solvent, separating the imine from the organic solvent and hydrolysing in acid medium the imine thus obtained to liberate free 6-amino-penicillanic acid.

Treatment of fermentation broths by one of the methods described above generally produces 6-amino-penicillanic acid in a purity from 70 to 95%. The pure compound can be obtained as follows by recrystallisation. The acid to be purified is suspended in water and then dissolved by adjusting the pH to about 7 by means of an alkali such as sodium, potassium or ammonium hydroxide. The solution is filtered and the 6-amino-penicillanic acid crystallised by acidification to a pH from 3 to 5 with a mineral or organic acid such as hydrochloric, phosphoric, sulphuric or acetic acid.

The following examples illustrate the invention.

The 6-amino-penicillanic acid content of the solutions and dry products was determined by biological titre after conversion to penicillin V by treatment with phenoxyacetyl chloride.

Example I

A fermentation broth (425 litres), pH 6.3, is filtered after the addition of a filter aid and the filter cake washed with water. The filtrate (440 litres) obtained, which contains 445 mg./litre 6-amino-penicillanic acid and the temperature of which is 23° C., is treated with salicylaldehyde (2.1 kg.) dissolved in acetone (6 litres). The mixture is stirred for 30 minutes and then cooled to +1° C. The extraction of the imine obtained is carried out with an installation consisting of a group of two-stage emulsifying-separating centrifuges set up for counter-current operation. The equipment is operated at the following flow-rates: aqueous solution of imine—200 litres/hour; ethyl acetate—80 litres/hour; aqueous 2 N sulphuric acid—sufficient to bring pH to 2.5. After the extraction, the ethyl acetate extract (160 litres) is recovered and clarified by filtration through a bed of filter aid. The extract is then concentrated under reduced pressure in a continuous recycling evaporator at a temperature not rising above 20° C., the volume being reduced to 10 litres. The concentrate is then treated with water (2.5 litres), and the mixture obtained stirred and its pH adjusted to 7 with 2 N ammonium hydroxide solution. After stirring for 15 minutes, the mixture is allowed to stand and the aqueous layer is separated. The organic layer is extracted again with water (2 litres followed by 1.5 litres) at pH 7. The aqueous extracts are combined and the resulting solution treated, with stirring, with a 10% aqueous solution (1.5 litres) of dibenzylethylenediamine diacetate. The precipitate obtained is separated, washed with water and dried in vacuo. A crude dibenzylethylenediamine salt of 6-salicylideneamino-penicillanic acid (370 g.) is thus obtained containing 121 g. of pure 6-amino-penicillanic acid, corresponding to a 60% content of the salt of the imine. This crude product possesses the following characteristics:

M.P. (Kofler): 100-105° C. (dec.)
$[\alpha]_D^{21} = 125° \pm 5°$ (c.=1, methanol)

The crude dibenzylethylenediamine salt of the imine (200 g.) obtained as described above is suspended in water (1 litre) and the suspension cooled to 0° C. in an ice-bath. Methylisobutylcarbinol (1.1 litres) is added and the mixture made acid to pH 1.5 with 3 N hydrochloric acid (0.45 litre). After stirring for 10 minutes, insoluble material (48 g. of inactive product) is filtered off and the two phases are separated. The aqueous solution is washed with methylisobutylcarbinol (0.9 litre) and the pH then taken to 3.3 with 2.5 N ammonium hydroxide solution (0.3 litre). A first fraction of crystalline 6-amino-penicillanic acid is obtained which, after 15 minutes, is separated, washed with water and dried in vacuo. This first fraction represents 89% pure 6-amino-penicillanic acid (60 g.). The two methylisobutylcarbinol solutions are combined and extracted at pH 1.5 with water (2 x 0.45 litre). The aqueous solutions are combined with the mother-liquors of the crystallisation and the mixture thus obtained is neutralised to pH 6 with 2.5 N ammonium hydroxide solution and concentrated to 0.28 litre under reduced pressure. The concentrate is filtered and acidified to pH 3.3 with 3 N hydrochloric acid. A second fraction is thus obtained which, after separation, washing and drying, represents 44% pure 6-amino-penicillanic acid (12 g).

The two combined fractions are recrystalliised together. The mixture is dissolved in distilled water (0.15 litre), the pH being adjusted to 7 with 2.5 N ammonium hydroxide solution (0.08 litre). The solution is filtered and then washed with n-butanol (0.05 litre). The aqueous phase is acidified to pH 3.3 with 3 N hydrochloric acid (0.07 litre), stirred slowly for 30 minutes and the 6-amino-penicillanic acid which has recrystallised is separated, washed and dried. Pure 6-amino penicillanic acid (54.4 g.) is thus obtained, the principal characteristics of which are as follows:

M.P.=208-210°C.
$[\alpha]_D^{20} = +268°$ (c.=0.3;N/10 hydrochloric acid).

Example II

A filtrate (100 litres; 305 mg./litre) of a production culture of 6-amino-penicillanic acid is treated with salicylaldehyde (0.51 kg.) dissolved in acetone (2 litres) as indicated in Example I. The aqueous solution obtained is cooled to +5° C. and treated, with stirring, with ethyl acetate (50 litres). The pH is adjusted to 2.5 by the addition of 2 N hydrochloric acid. After stirring for 15 minutes, the mixture is allowed to stand and the ethyl acetate separated. A second extraction with ethyl acetate (50 litres) is carried out. The combined organic extracts are clarified and then concentrated under reduced pressure in a continuous recycling apparatus, the temperature not being allowed to rise above 20° C. When the volume reaches 2 litres, methyl isobutyl ketone (4 litres) is continuously introduced into the apparatus so as to maintain constant volume, the temperature not being allowed to rise above 25° C. The concentrate is treated, with stirring, with a 15% acetonic solution of sodium ethylhexoate (0.250 litre) followed by hexane (15 litres). The precipitate formed is separated, washed with hexane and dried under reduced pressure. A crude sodium salt of 6-salicylidene-amino-penicillanic acid (97 g.) is thus obtained containing 18% pure 6-amino-penicillanic acid, corresponding to a 30% content of the salt of the imine. This crude product possesses the following characteristics:

M.P. (Kofler): 155°-165° C. (dec.)
$[\alpha]_D^{21} = +50 \pm 10°$ (c.=1; water).

The crude sodium salt of the imine (50 g.) is dissolved in water (1 litre) and, after cooling to +5° C., acidified to pH 1.7 with 3 N hydrochloric acid (0.05 litre) The solution is filtered and then washed with n-butanol (2 x 0.25 litre). The pH is adjusted to 3.4 by addition of dilute ammonium hydroxide solution and the solution is concentrated to 0.3 litre under reduced pressure, the temperature not being allowed to exceed 20° C. The product which crystallises is separated, washed with water and dried. 93% pure 6-amino-penicillanic acid (0.99 g.) is thus obtained. The butanol solutions are combined and extracted with water (2 x 0.125 litre) at pH 1.5. The aqueous solution is partially neutralised to pH 3.4 and combined with the crystallisation mother-liquors. After concentration under reduced pressure to 0.02 litre, a second crop of 46% pure 6-amino-penicillanic acid (5 g.) is isolated. The second crop is recrystallised from water as indicated in Example I. This procedure produces 82% pure 6-amino-penicillanic acid (2.1 g.).

Example III

A filtrate (420 litres) of a culture containing 6-amino-penicillanic acid (500 mg./litre) is treated as described in Example I but the pH is adjusted to 7.5 before the addition of the aldehyde [salicylaldehyde (4 kg.) is used] and the ethyl acetate is replaced by methyl isobutyl ketone.

A crude dibenzylethylenediamine salt of 6-salicylideneamino-penicillanic acid (490 g.) is finally recovered containing 74 g. of pure 6-amino-penicillanic acid. The crude product (311 g.) isolated above is treated as in Example I and yields a first crop of pure 6-amino penicillanic acid (23.3 g.), M.P. 210° C. (dec.) and a second crop of 65% purity (18.5 g.).

*Example IV*

A filtrate (440 litres) containing 6-amino penicillanic acid (480 mg./litre) is treated as in Example III but with the methyl isobutyl ketone replaced by dichloroethane. A crude dibenzylethylenediamine salt of 6-salicylideneamino-penicillanic acid (273 g.) is recovered containing 67 g. of pure 6-amino-penicillanic acid.

This crude salt is purified by recrystallisation as follows. The salt (4 g.) is dissolved in chloroform (130 cc.) and the solution filtered and cooled in an ice-bath. Diethyl ether (130 cc.) is then added dropwise and, after standing for 15 minutes, the crystals are separated, washed with diethyl ether and dried.

A crystalline product (1.8 g.) is thus obtained in the form of white needles, M.P. 135–145° C. (dec.), $[\alpha]_D^{21}=+135°$ (c.=0.3; methanol); $[\alpha]_D^{21}=+143°$ (c.=0.3; chloroform).

The crude salt (150 g.) is suspended in water (750 cc.) and the suspension cooled to +4° C. 3 N hydrochloric acid (324 cc.) is added slowly with stirring followed, 15 minutes after the completion of the addition of the acid, by butanol (800 cc.). After vigorous stirring, the insoluble material is filtered off and the phases are separated. The aqueous solution is again washed with butanol (550 cc.) after which its pH is adjusted to 3.3 with 2.5 N ammonium hydroxide solution. After standing for 15 minutes, the crystalline 6-amino-penicillanic acid is separated, washed with water and dried in vacuo. 81% pure 6-amino-penicillanic acid (16.3 g.) is thus obtained.

The butanol solutions are combined and extracted with water (600 cc.) acidified to pH 1.5. The aqueous phase is combined with the crystallisation mother-liquors of the first crop and the pH of the mixture is adjusted to 6 with 2.5 N ammonium hydroxide solution. After concentration under reduced pressure, at a temperature below 20° C., to one third of the original volume, the pH is again adjusted to 3.3 with dilute hydrochloric acid. A second crop of 64% pure crystalline 6-amino-penicillanic acid (15.1 g.) is isolated.

The two crops, recrystallised as indicated in Example I, yield pure 6-amino-penicillanic acid (22.3 g.), $[\alpha]_D^{22}=+276°$ (c.=0.3; 0.1 N hydrochloric acid).

*Example V*

Cinnamaldehyde (4.2 g.) is added to an aqueous solution (90 cc.) of 6-amino-penicillanic acid (6 g.), after adjustment of the pH to 7. The mixture is stirred vigorously for 30 minutes at ambient temperature and then treated with a 10% aqueous solution (90 cc.) of dibenzylethylenediamine diacetate. After stirring slowly for 15 minutes, the crystals which form are separated, washed with water and dried. The dibenzylethylenediamine salt of 6-cinnamylideneamino-penicillanic acid (14.2 g.) is recovered, M.P. 105–115° C. (dec.), containing 4.3 g. of pure 6-amino-penicillanic acid.

The crude salt (2.5 g.) is recrystallised by dissolving in chloroform (20 cc.), filtering and adding diethyl ether (40 cc.) slowly with stirring. After separation, washing and drying, the dibenzylethylenediamine salt of 6-cinnamylideneamino-penicillanic acid (1 g.) is recovered as a yellow micro-crystalline powder, M.P. 130–135° C. (dec.), $[\alpha]_D^{24}=+103°$ (c.=0.3; methanol), which is insoluble in water, acetone and water-acetone mixture (50:50 v./v.) and soluble in chloroform, methanol, pyridine and dimethylformamide.

By treatment of the crude dibenzylethylenediamine salt of 6-cinnamylidenamino-penicillanic acid (11 g.) as indicated in Example IV in order to liberate 6-amino-penicillanic acid, white crystals (1.6 g.) M.P. 210° C. are obtained which contain 1.1 g. pure 6-amino-penicillanic acid.

*Example VI*

The dibenzylethylenediamine salt of 6-benzylideneamino-penicillanic acid can be prepared and recrystallised by the method indicated in Example V for the cinnamic derivative. In the pure state, it possesses the following characteristics; white microneedles which melt and yellow at about 110° C. and then resolidify and decompose at 165° C.; $[\alpha]_D^{20}=+133°$ (c.=0.3; methanol), insoluble in water, less than 0.5% soluble in chloroform, 0.5% soluble in acetone, and more than 1% soluble in methanol, pyridine, dimethylformamide, and acetone-water mixture (50:50 v./v.).

*Example VII*

Proceeding as in Example V, but starting with anisaldehyde, the dibenzylethylenediamine salt of 6-anisylideneamino-penicillanic acid can be prepared.

The characteristics of the purified product are as follows: white micro-needles, melting with yellowing at 90–105° C. and then resolidifying and decomposing at 140° C.; $[\alpha]_D^{24}=+129°$ (c.=0.3; methanol), insoluble in water and diethyl ether, 0.5% soluble in acetone and acetone-water mixture (50:50 v./v.) and more than 1% soluble in chloroform, methanol, pyridine and dimethylformamide.

*Example VIII*

An aqueous solution of 6-amino-penicillanic acid (1 g.) is adjusted to pH 7 and then treated with 2-ethylbutyraldehyde (0.6 g.). After stirring for 30 minutes at ambient temperature, a 10% aqueous solution (15 cc.) of dibenzylethylenediamine diacetate is added. The precipitate which forms is separated, washed with water and dried. A white microcrystalline powder (0.90 g.) is obtained which is the dibenzylethylene diamine salt of 6-(2-ethylbutylideneamino)-penicillanic acid, M.P. 135° C. (dec.), $[\alpha]_D^{21}=+103°$ (c.=0.3; methanol), insoluble in water and water-acetone mixture (50:50 v./v.), 0.5% soluble in acetone, and more than 1% soluble in chloroform, methanol, pyridine and dimethylformamide.

*Example IX*

An aqueous solution of 6-amino-penicillanic acid (5 g.) is adjusted to pH 7 and treated with a 30% neutral aqueous formaldehyde solution (10 cc.). After stirring for 30 minutes at ambient temperature, the pH falls spontaneously to 4.1. The solution is cooled to +4° C., ethyl acetate (40 cc.) added and the pH adjusted to 2.5 with 3 N hydrochloric acid. After stirring, the aqueous phase is decanted and extracted with ethyl acetate (2 x 40 cc.). The organic phases are combined, dried over sodium sulphate and evaporated to dryness under reduced pressure at a temperature near to 0° C.

6-methyleneamino-penicillanic acid (4.7 g.) is thus obtained in the form of an amorphous white powder, decomposing at about 140° C.; $[\alpha]_D^{20}=+304°$ (c.=0.3; acetone), insoluble in water and diethyl ether and soluble in acetone to the extent of more than 20 mg./cc.

6-methyleneamino-penicillanic acid (1 g.), prepared as described above, is suspended in water (15 cc.) at 4° C. and the pH is adjusted to 1.5 by the addition of 3 N hydrochloric acid. There is then added an aqueous solution (2.8 cc.) of acetaldehyde (80 g./litre). After agitation of the mixture for 1 hour at 4° C., the insoluble matter is filtered off, the filtrate washed with butanol (20 cc.) and the aqueous phase is separated, neutralised and concentrated to dryness under reduced pressure and at a temperature below 20° C. There is thus obtained a microcrystalline, white powder (200 mg.) containing 24% of pure 6-amino-penicillanic acid.

We claim:

1. A process for the preparation of substantially pure 6-aminopenicillanic acid from a dilute aqueous solution thereof which comprises mixing with agitation and at a temperature from 0° to 30° C. the said aqueous solution and from one to 30 moles per mole of the acid of an aldehyde selected from the class consisting of salicylaldehyde, cinnamaldehyde, anisaldehyde, and benzaldehyde, the said solution being adjusted to a pH from 6 to 9, extracting the imine thus formed from the resultant reaction mixture with a water-immiscible organic solvent selected from the class consisting of butyl alcohol, amyl alcohol, ethylacetate, butylacetate, amyl acetate, methyl isobutyl ketone, and methylene chloride, separating the imine from the said organic solvent and hydrolysing in acid medium the imine thus obtained to liberate pure 6-amino-penicillanic acid.

2. A process according to claim 1 in which a reagent selected from the class consisting of the hydroxides of sodium and potassium and the salts of sodium and potassium which are soluble in the said water-immiscible organic solvent is added to the solution of the imine in the said organic solvent and the imine salt thus produced is separated and subjected to the said hydrolysis in acid medium.

3. A process according to claim 1 in which the imine is extracted with water from its solution in the said water-immiscible organic solvent, and precipitated from the resultant aqueous solution in the form of water-insoluble salt, which is separated and hydrolysed in the said acid medium.

References Cited by the Examiner

UNITED STATES PATENTS 2,941,995  6/1960  Doyle et al. _____ 260—239.1

OTHER REFERENCES

Wertheim, Textbook of Organic Chemistry, page 468 (1945).

NICHOLAS S. RIZZO, *Primary Examiner.*